July 18, 1961 H. BRUGGER 2,992,716
ELECTROMAGNETIC CLUTCH LAMINATIONS AND METHOD
OF MANUFACTURE THEREFOR
Filed Sept. 8, 1958
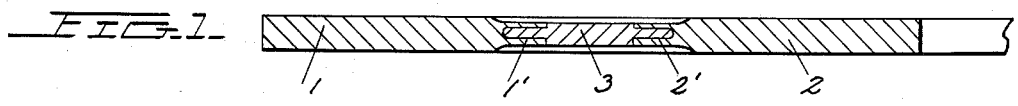
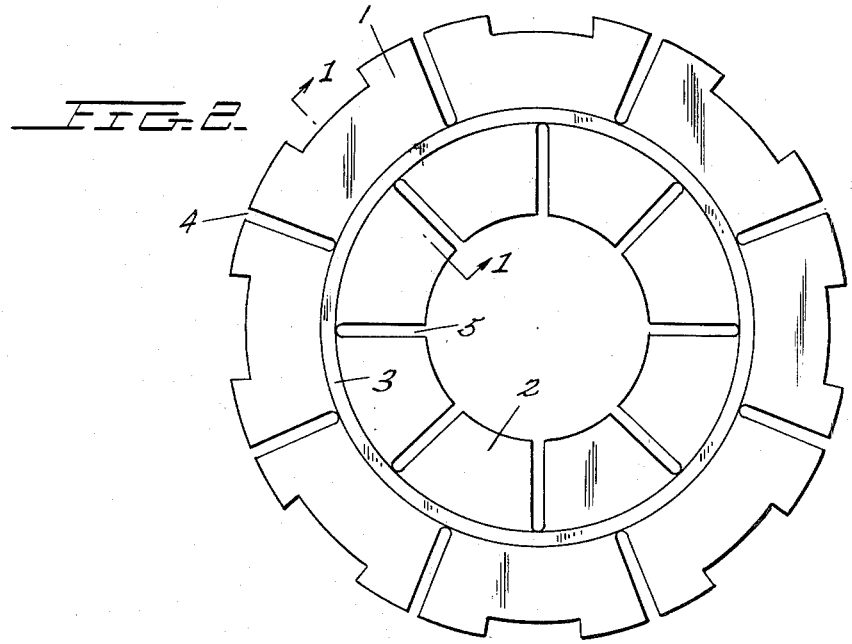
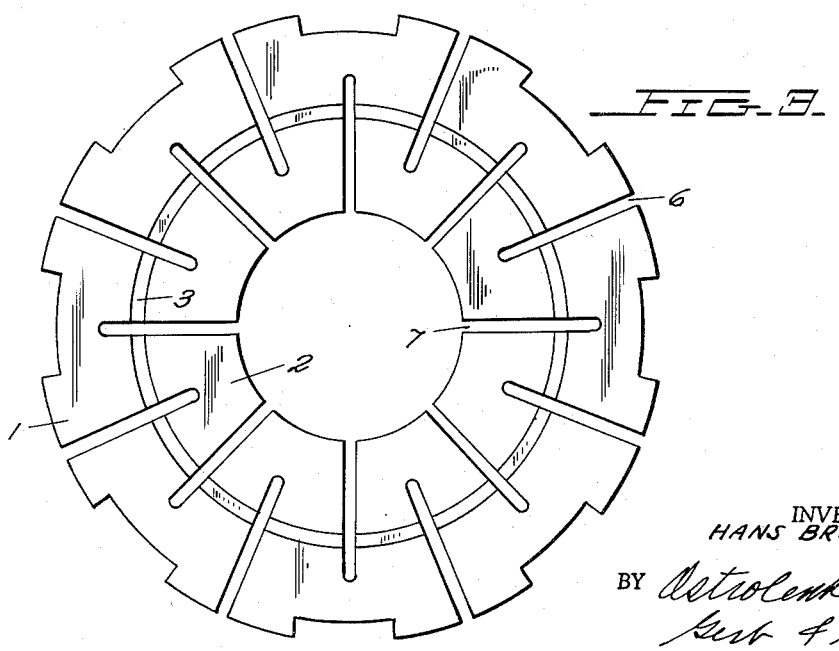
INVENTOR.
HANS BRUGGER
BY
ATTORNEYS

United States Patent Office 2,992,716
Patented July 18, 1961

2,992,716
ELECTROMAGNETIC CLUTCH LAMINATIONS AND METHOD OF MANUFACTURE THEREFOR
Hans Brugger, Friedrichshafen, Germany, assignor to I-T-E Circuit Breaker Company, Philadelphia, Pa., a corporation of Pennsylvania
Filed Sept. 8, 1958, Ser. No. 759,673
Claims priority, application Germany Dec. 20, 1957
2 Claims. (Cl. 192—107)

My invention relates to a novel lamination structure for laminations of electromagnetic clutches and to a novel method for manufacturing the laminations.

Electromagnetic clutch laminations are well known in the art and are typically shown in U.S. Patent No. 2,344,111, issued March 14, 1944, to A. Ryba. Generally electromagnetic clutches utilizing laminations or disks as the clutching medium have a first plurality of laminations attached to a driving member, and a second plurality of laminations attached to the driven member. The first and second pluralities of laminations are interleaved with respect to one another to form a stack, and are normally spaced apart from one another so that the laminations may rotate with respect to one another. In order to compress the lamination stack so as to rigidly connect the driving and driven member through the laminations, a magnetic field generating means is positioned to pass a magnetic field through the laminations and ultimately to an armature so that forces are applied by the armature to compress the laminations into a relatively rigid stack.

Normally, the magnetic circuit for actuating a clutch, as described above, includes the stack of magnetic laminations. The flux first traverses an outer annular portion of the disk, until it reaches the armature and then from the armature, the flux returns through a second and inner annular portion of the laminations to the magnetic flux generating source.

Since the first and second annular portions of each disk must necessarily be magnetically isolated from one another in order to prevent short circuiting of the flux before it reaches the armature, it has been the practice to insert an annular ring of openings in the magnetic material of the disk to isolate the first and second annular portions which are to carry the flux. The relatively small radial cross-section of iron which remains to connect the outer and inner annular areas of the disk is so small that it saturates relatively quickly and, in effect, the two annular portions are separated by a continuous air gap. However, it will be readily apparent that the mechanical strength of the disks or laminations is substantially decreased, since the outer and inner annular portions are joined only by relatively thin bridges of material.

The principle of my invention is to provide a novel clutch lamination of the above noted type wherein the outer and inner annular portions of magnetic material of each disk are rigidly connected to one another by means of an annular-shaped non-magnetic insert.

In providing a non-magnetic insert, all of the above noted operations may proceed wherein a path for magnetic flux to the armature is provided by one of the annular areas of magnetic material, while a return path is provided by the other annular area of magnetic material.

The two individual magnetic portions are completely isolated from one another by means of the magnetic insert, and the lamination is a unitary member with the two magnetic portions rigidly fastened to one another.

I have further found that during operation of the laminations, or disks, there is an appreciable amount of heating due to the frictional engaging and disengaging operations between adjacent laminations. In order to prevent breakage of the disk or non-elastic deformation of the disks because of thermal deformation, I have further provided a plurality of radial slots for each disk which extend from the inner diameter of the disk to some central portion, or from the outer diameter of the disk to some central portion, or both. The effect of these slots is to allow flexing of the disk due to thermal distortion without forcing any non-elastic deformation within the disk.

In order to manufacture my novel unitary disk member comprised of a first and second annular-shaped magnetic portion isolated by a non-magnetic portion, I select a material of relatively large resistivity for the non-magnetic connecting portion, and a material of a relatively lower resistivity for the two annular portions of magnetic material. The three members are then formed into a unitary piece by a resistance welding process.

Because of the difference in the resistivity of the magnetic and non-magnetic portions, during the welding process, the magnetic material will flow before the non-magnetic material flows, whereby the magnetic material of the outer annular-shaped portion adjacent the outer diameter of the non-magnetic annular-shaped portion will flow around the edges of the outer diameter to form a slot within which the non-magnetic material is bound.

In a similar manner, the inner annular-shaped portion of magnetic material will flow first so as to form a slot within which the inner diameter of the annular-shaped portion of non-magnetic material is positioned.

Thus, the ring-shaped non-magnetic member will be positioned within two opposing slots of the inner and outer annular-shaped portions of magnetic material because the magnetic material is the first to flow.

After further heating, the insert of non-magnetic material will begin to flow whereby the magnetic material and non-magnetic material portions adjacent one another will combine and thereafter be hardened to form an extremely rigid bond between adjacent portions.

During this process, the insert of non-magnetic material may have its thickness decreased by appropriate selection of the electrode pressures during a resistance welding process. This decrease will depress the surface of the non-magnetic insert below the surface of the adjacent magnetic members whereby the non-magnetic portion will not come into engagement with any portions of adjacent disks during clutch operation. Thus, the designer will be free to select a material for the non-magnetic insert independently of its frictional characteristics.

Accordingly, a primary object of my invention is to provide a novel electromagnetic clutch lamination which is manufactured by a novel process.

Another object of my invention is to provide a lamination for electromagnetic clutches which is to carry flux in a first and second direction wherein a first annular portion of magnetic material is magnetically isolated from a second annular portion of magnetic material by a non-magnetic spacer means.

Another object of my invention is to provide a continuous lamination for electromagnetic clutches in which the lamination portion which carries flux in a first direction is isolated from the lamination portion carrying flux in a second direction without weakening the lamination by removing material.

Another object of my invention is to provide a novel method for manufacturing a lamination composed of a first and second magnetic portion which are magnetically isolated by a non-magnetic portion.

Another object of this invention is to provide a novel method of manufacturing a clutch lamination wherein the resistivity of a first and second magnetic annular-shaped portion is lower than the resistivity of a non-magnetic annular-shaped portion which mechanically connects the two magnetic portions, but magnetically isolates the two.

These and other objects of my invention will become apparent from the following description when taken in connection with the drawings, in which:

FIGURE 1 shows a cross-sectional view of a first and second annular-shaped magnetic ring which are joined by a non-magnetic ring to form a unitary structure.

FIGURE 2 shows a side view of the lamination illustrated in FIGURE 1 where FIGURE 1 is taken across section 1—1 of FIGURE 2.

FIGURE 3 is similar to FIGURE 2 and shows an alternate method in which the lamination may be slotted in order to accommodate thermal distortion of the lamination.

Referring now to FIGURES 1 and 2, the lamination of my novel invention is seen as comprising a first annular-shaped portion of magnetic material 1, and a second annular-shaped portion of magnetic material 2.

The magnetic flux required to operate a clutch including the lamination of FIGURES 1 and 2 will go in a direction, for example, which is into the paper in traversing annular-shaped area 1, and in a direction which would be out of the paper in traversing the annular-shaped area 2.

In order to magnetically isolate portions 1 and 2 without detracting from the mechanical strength of the lamination, I provide a non-magnetic insert or ring 3 which prevents the short circuiting of flux from portion 1 to portion 2. The lamination of FIGURE 2 is further provided with slots, such as slot 4, which extends from the outer diameter of the lamination to some central portion, and slot 5 which extends from the inner diameter of the lamination to a central portion. The purpose of these slots is to absorb the stress imparted to the lamination during heating of the lamination when it is in operation.

While slots 4 and 5 of FIGURE 2 terminate before they pass through the non-magnetic spacer 3, there is no need for this type of termination. Thus, as is seen in FIGURE 3, slots 6 and 7 which are equivalent to slots 4 and 5 of FIGURE 2 are shown as terminating after passing completely through the non-magnetic insert 3. However, the function of slots 6 and 7 will be identical to that described above for slots 4 and 5.

As is best seen in FIGURE 1, the magnetic portions 1 and 2 are rigidly fastened to non-magnetic portion 3 particularly because the non-magnetic portion 3 rests in a slot 1' of portion 1, and 2' of portion 2. In order to form this novel connection, I use a resistance welding process and select a material for magnetic portions 1 and 2 which has a relatively low resistivity as compared to the resistivity of ring 3. Thus, when a resistance welding process is initiated, the material of portions 1 and 2 adjacent insert 3 will begin to flow before the material of insert 3 will flow. Thus, the material of portions 1 and 2 will creep over the surface of the abutting section 3 to form the slot type configuration shown in FIGURE 1.

The material of insert 3 will then begin to flow so that there will be an intermixture of the materials of insert 3 and magnetic portions 1 and 2. The welding process is then stopped, and when the materials cool they form an extremely rigid bond so that the lamination is as strong as though it were a single member. If desired, the pressure of the welding electrodes may be so controlled that the thickness of insert 3 is decreased, as seen in FIGURE 1, so that the non-magnetic insert 3 will be depressed below the surface of magnetic portions 1 and 2 and, therefore, will not take part in the torque transmission process when the lamination is in operation in a clutch.

Although I have described preferred embodiments of my novel invention, many variations and modifications will now be obvious to those skilled in the art, and I prefer therefore to be limited not by the specific disclosure herein but only by the appended claims.

I claim:

1. A spring type lamination for an electromagnetic clutch; said lamination being comprised of a first relatively thin and flexible annular-shaped inner member and a second relatively thin and flexible annular-shaped outer member; said first and second annular-shaped members lying in a common plane, the outer diameter of said first member being in radially spaced reationship with respect to the inner diameter of said second member; each of said first and second members being constructed of a magnetic material; a third annular-shaped continuous member of non-magnetic material; said third member being radially interposed between said first and second members; said third member having its outer diameter rigidly connected to the inner diameter of said second member; the inner diameter of said third member being rigidly connected to the outer diameter of said first member; said third member magnetically isolating said first and second members; said first and second members and said third member forming a rigid coplanar unitary member.

2. A spring type lamination for an electromagnetic clutch; said lamination being comprised of a first annular-shaped inner member and a second annular-shaped outer member; said first and second annular-shaped members lying in a common plane, the outer diameter of said first member being in radially spaced relationship with respect to the inner diameter of said second member; each of said first and second members being constructed of a magnetic material; a third annular-shaped member of non-magnetic material; said third member being radially interposed between said first and second members; the inner radial surface of said second member defining a first circular slot; the outer radial surface of said first member defining a second circular slot; the outer diameter of said third member being rigidly secured in said first circular slot; the inner diameter of said third member being rigidly secured in said second circular slot; said third member magnetically isolating said first and second members; said first and second members and said third member forming a rigid coplanar unitary member; each of said first and second members having radial slots therein to permit elastic deformation of said lamination due to heat, said radial slots extending through said third annular shaped member of non-magnetic material.

References Cited in the file of this patent

UNITED STATES PATENTS

| 519,031 | Beaumont | May 1, 1894 |
| 942,186 | Ravenshow | Dec. 7, 1909 |
| 1,341,682 | Starker | June 1, 1920 |
| 2,344,111 | Ryba | Mar. 14, 1944 |
| 2,554,874 | Oetzel | May 29, 1951 |
| 2,598,027 | Weir et al. | May 27, 1952 |
| 2,856,049 | Schjolin | Oct. 14, 1958 |